United States Patent [19]
Amorese et al.

[11] Patent Number: 5,582,799
[45] Date of Patent: Dec. 10, 1996

[54] CLOSURE FOR CLEAN CHEMICAL REACTOR

[75] Inventors: Franklyn J. Amorese, Hilton; Morris E. Gruver, III, Rochester, both of N.Y.

[73] Assignee: Pfaudler, Inc., Rochester, N.Y.

[21] Appl. No.: 411,432

[22] Filed: Mar. 27, 1995

Related U.S. Application Data

[63] Continuation of Ser. No. 541,701, Jun. 21, 1990.

[51] Int. Cl.$^6$ .............................. G05B 9/05; B01J 19/00
[52] U.S. Cl. ....................... 422/118; 422/241; 422/242; 220/327
[58] Field of Search .................................. 422/118, 241, 422/242; 220/327

[56] References Cited

U.S. PATENT DOCUMENTS

| | | | |
|---|---|---|---|
| 1,148,817 | 8/1915 | Alliot | 422/242 |
| 1,426,920 | 8/1922 | Sleeper . | |
| 1,440,109 | 12/1922 | Schenck . | |
| 1,803,306 | 4/1931 | Stengel . | |
| 2,330,306 | 9/1943 | Murphy | 220/55 |
| 2,384,386 | 9/1945 | Malmberg | 220/46 |
| 2,692,291 | 10/1954 | Bryan | 260/600 |
| 2,967,699 | 1/1961 | Brown | 261/114 |
| 3,282,459 | 11/1966 | Wilson | 220/3 |
| 3,298,794 | 1/1967 | Mikesell, Jr. et al. | 23/290 |
| 3,313,599 | 4/1967 | Boon | 23/290 |
| 3,332,573 | 7/1967 | Romanos | 220/46 |
| 3,462,041 | 8/1969 | Wilson | 220/46 |
| 3,578,407 | 5/1971 | Arnold et al. | 23/252 |
| 3,655,090 | 4/1972 | Rothrock et al. | 220/42 A |
| 3,951,300 | 4/1976 | Kalasek | 220/327 |
| 4,335,074 | 6/1982 | Bernas | 422/102 |
| 4,579,248 | 4/1986 | Gorges | 220/327 |

FOREIGN PATENT DOCUMENTS

| | | |
|---|---|---|
| 0071811 | 2/1983 | European Pat. Off. . |
| 1417502 | 12/1964 | France . |
| 2700811 | 7/1978 | Germany . |

*Primary Examiner*—Nina Bhat
*Attorney, Agent, or Firm*—Michael L. Dunn

[57] ABSTRACT

Apparatus and methods of closing and sealing chemical reactor vessels, which are relatively less susceptible to contaminant build-up and more easily maintained in such a state.

The chemical reactor vessel comprises a vessel body and a separable head attached thereto wherein the means for attaching and sealing said head to said body comprises; a seal means, a flange means, a shield means and an attachment means.

The seal means functions, in compression, to prevent leakage of fluids into and from said chemical reactor vessel. The flange means functions to impose compressive loads to the seal means to cause the seal means to prevent leakage of fluids into and from the chemical reactor vessel. The shield means are integral with at least one of the flange means, which function to substantially prevent contaminants from contacting the seal means and those portions of such flange means which are adjacent to the seal means and which function to inhibit the build-up of contaminants within and adjacent to the attaching and sealing means. The attachment means function to apply compressive loads to the flange means and concurrently function to removably fix the head to the body. The attachment means are subject to the functions of the shield means and which, concurrently, function to fix the shield means to the chemical reactor vessel such that the shield means cannot be separated from the chemical reactor vessel without first disassembling the attachment means and releasing the compressive loads from the flange means.

5 Claims, 5 Drawing Sheets

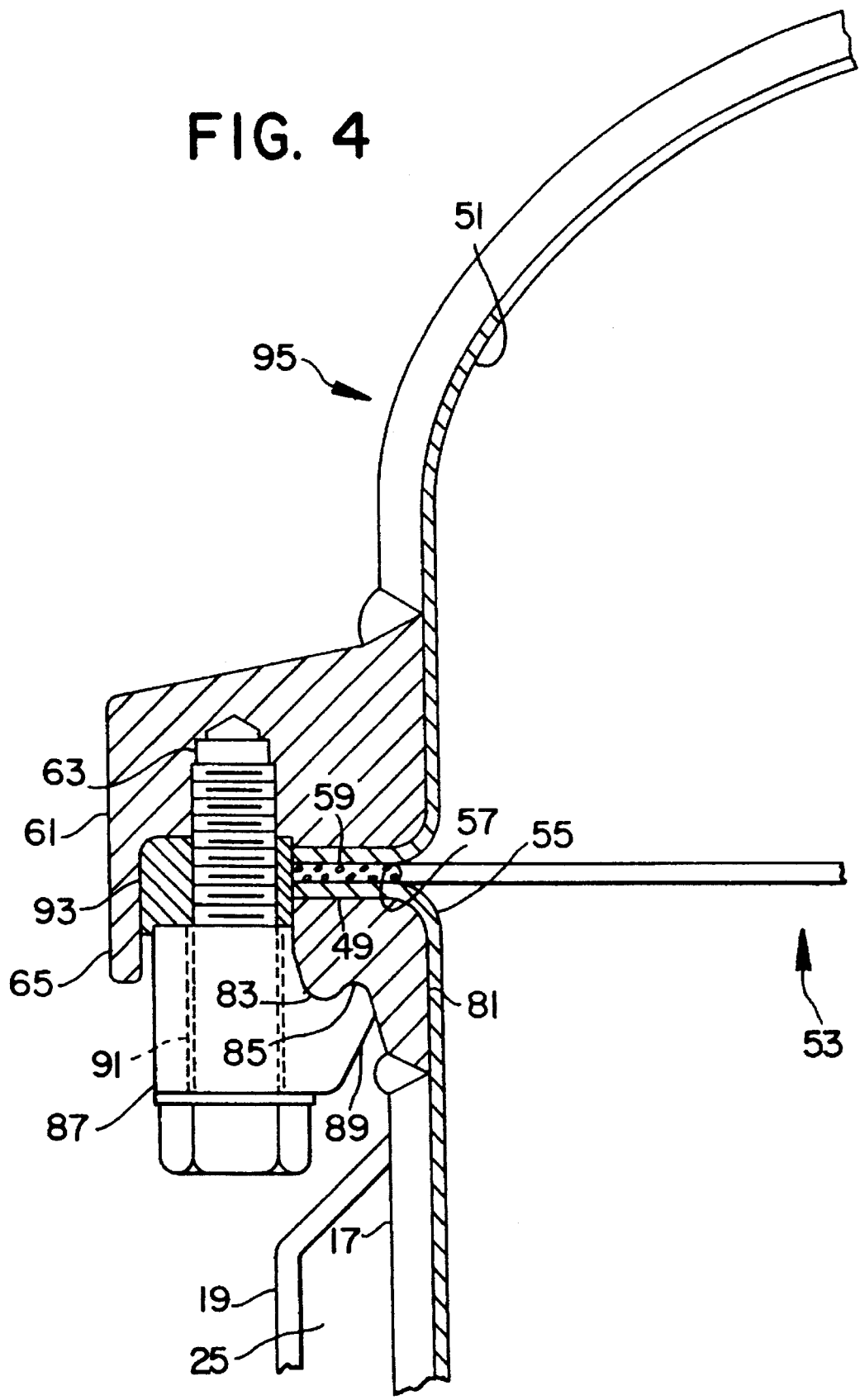

CLOSURE FOR CLEAN CHEMICAL REACTOR

This is a continuation of application Ser. No. 07/541,701, filed Jun. 21, 1990.

BACKGROUND OF THE INVENTION

1. Field of the Invention

The present invention relates generally to apparatus and methods of closing and sealing chemical reactor vessels and specifically to closure systems, for such vessels, which are relatively less susceptible to contaminant build-up and more easily maintained in such a state.

2. Background of the Prior Art

Glass and enameled reactor vessels have become well known and broadly used for carrying out elevated or reduced temperature and/or elevated or reduced pressure chemical reactions as well as the blending (mixing) of non-reacted elements or compounds. Such vessels may be jacketed, having one or more additional partial or full shells surrounding, but spaced apart from, the vessel wall. The space between the shells or between the shell and the vessel wall may be filled with gas, liquid or solid materials either as a static medium, such as a low heat conducting solid material for insulation or in a dynamic state, i.e., flowing liquid and/or gas for cooling and/or heating purposes.

Where such vessels are used in certain applications such as, for examples, in the food industry and, in particular, in the pharmaceutical industry, cleanliness and the ability to continuously maintain cleanliness are of the utmost importance.

Typically, the inner surfaces of such vessels are coated with glass, vitrified enamel or some other generally non-metallic, corrosion, erosion and/or temperature-resistant material. Many of these materials, e.g. glass, tend to be relatively brittle and prone to fracture upon impact or significant distortion. Therefore, it becomes necessary, in order to successfully attach heads, covers, tops, fixtures, piping, etc. to such vessels, to use specialized joints which will diminish and, essentially, eliminate the risks of the glass cracking or otherwise failing. Such joints are typically designed to diminish localized flex-induced stress and to otherwise uniformly distribute stress and strain, both at ambient temperatures and at elevated temperatures. An example of an enameled, jacketed vessel, and the joints used to attach the head to the vessel, are shown in U.S. Pat. No. 2,330,306. Note that in several embodiments of U.S. Pat. No. 2,330,306, a removable sheet metal cover is telecoped down over the upwardly curved part of the head to form a joint cover. In this design, dirt and contamination can readily accumulate at the unsealed joint where the perforation in the sheet metal cover abuts the curvature of the head.

Typical designs of such joints frequently include two parallel glass or enamel coated surfaces, facing each other, with some form of a gasket and/or other deformable material therebetween. Also included are means, such as a combination of relatively heavy flanges and clamps, arranged to impose uniform force, without localized flex-induced stress, urging both coated surfaces towards each other. The structure supporting those surfaces must be sufficiently rigid to uniformly distribute such force, without distorting those surfaces, to effect uniform compression or deformation of the gasket or other interspaced materials, thus sealing the two glassed or enameled surfaces sufficiently to, for example, enable the joint to contain high internal pressures, at elevated temperature in some cases, within such vessels. Alternatively, the vessel application may be at ambient or even cryogenic temperatures and the pressure may be external, i.e., a vacuum is being imposed within the vessel. A typical example of such a heavy rigid flange clamping arrangement is seen in U.S. Pat. No. 2,967,699.

The pharmaceutical industry, as mentioned above is extremely sensitive to cleanliness in all aspects of its manufacturing processes, deeming it of great importance to eliminate contaminants and enhance purity values. Much of the impetus for such a policy is founded upon a myriad of governmental regulations which dictate standards of sanitation, cleanliness, sterilization and purity to a heightened degree which is not generally applicable to other segments of the chemical industry. To enhance the ability of the pharmaceutical industry to comply with such expectations and standards, it is not only necessary to insure cleanliness to those areas of equipment which directly contact the actual chemical reactions, etc., which are carried out in the production of pharmaceuticals, but it is also necessary to design all equipment elements, even those portions which are remote from the actual chemical reactions, to be and remain as contaminant-free and clean as possible. In one sense, this means eliminating and/or diminishing as much as reasonably possible, those aspects of any given apparatus which tend to collect contamination or "dirt". In another sense, this means designing the various elements of apparatus for ease and facility of cleaning. Specifically, this means that there is a need for an enhanced means for connecting covers, or heads, to reactor vessels which are relatively contaminant free and easier to clean in comparison to those systems which are conventionally used throughout the general chemical processing industry.

Chemical reactor vessels have generally used clamping systems to join abutting flanges, covers or heads to the body or shell of the vessel. Frequently, these clamping systems include separate and distinct clamping mechanisms sometimes movably attached to the covers or heads, sometimes movably attached to the body or shell of the vessel and sometimes entirely separable, i.e. removable, from the joints formed between the abutting flanges. Such clamping mechanisms contain exposed screw mechanisms, or over-riding cam mechanisms, all of which have multiple complex and relatively tiny crevices, corners and pockets in which contaminants can build up and which are somewhat difficult to clean, and continuously keep clean, without removing the clamping mechanism from the joint or, at least, relaxing the force imposed on the joint by the clamping mechanism. This causes problems and concerns. Firstly, the facility to readily accumulate contamination is not at all desirable. Secondly, the inability to frequently and periodically remove the contamination build up, without shutting down the chemical reactor, is unacceptable. The more susceptible to contamination build up and retention a clamping mechanism is, the more frequently it must be cleaned and the more difficult it is to keep clean. Also, the care that must be exercised in cleaning must be more intense.

BRIEF SUMMARY OF THE INVENTION

The invention comprises means for attaching and means for sealing separable components of a chemical reactor vessel, wherein, when that vessel is disposed in its operable position, neither the attaching nor the sealing means are subjected to the gravity effected deposition of contaminants thereon, nor are the immediately surrounding proximate and adjacent sections or regions of the reactor vessel. All such sections or regions, as well as both the attaching means and the sealing means, are shielded by means integral with the reactor vessel, in such a manner that fluids and solids are diverted away from such areas. (As used herein, the terms "integral" and "integrally", in addition to their general dictionary definitions also specifically mean and indicate that the element associated with such term or terms is part of another element and not separate or readily separable therefrom.) Further, preferably substantially all surfaces of such sealing means, and those surfaces adjacent thereto, which are exposed to ambient conditions exterior to the reactor vessel, are arranged generally vertically, thus diminishing, if not eliminating, the susceptibility for gravity induced collection thereon of most contaminants. Those contaminants which are airborne, such as liquid vapor or gases, when condensed upon such attaching and sealing means in sufficient concentrations to be of concern, will readily fall off, likewise due to the affects of gravity. What residue of contaminants that do adhere to the surfaces of the sealing means are readily dispelled by the application of fluid cleaning mediums, e.g., liquid cleaning and disinfection solvents and/or pressurized steam, without shut-down of the reactor and disassembly of the sealing means. The chemical reactor vessel comprises a head and a body. Attachment means are used to removably fix the head to the body by effecting a compressive load onto the seal means. The seal means are interposed in relation to flange means. The flange means are associated with the juncture between the head and the body of the reactor vessel, and it is the flange means, specifically, to which the attachment means impose a compressive load with the flange means, in turn, imposing a compressive load in regard to the seal means.

BRIEF DESCRIPTION OF THE DRAWINGS

FIG. 4 is a semi-schematic, cross-sectioned, cut-away, elevational view of a chemical reactor vessel, including a section of body and a section of a dome-design head, the head being sealed to the body and attached thereto by another of the preferred attachment means of the present invention.

DETAILED DESCRIPTION OF THE INVENTION

Figure 1:
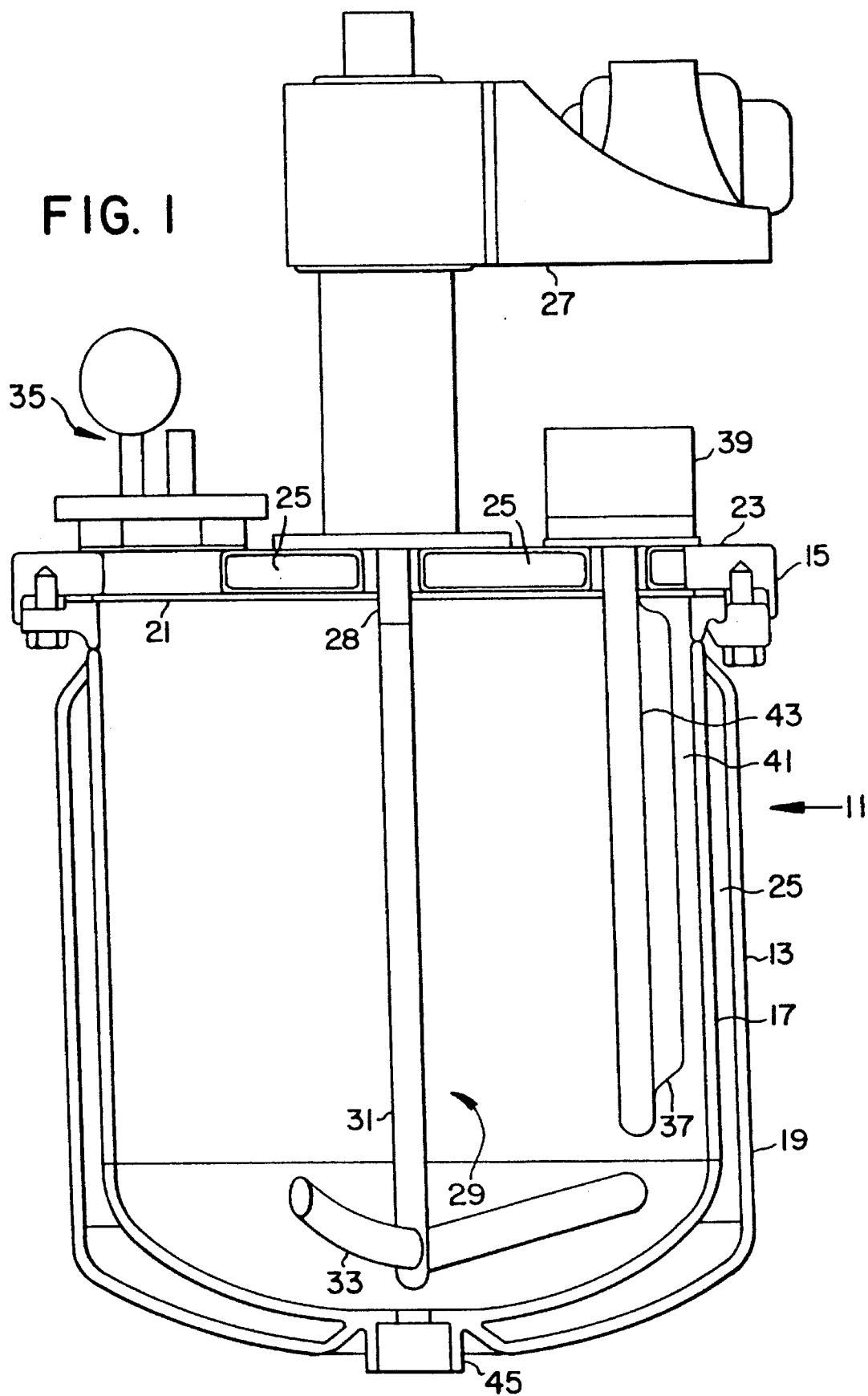
FIG. 1 is a semi-schematic, cross-sectional, cut-away, elevational view of a chemical reactor assembly including the vessel body, the head with auxiliary attachments mounted thereto, and including alternative embodiments of the attachment means of the present invention which attach the head to the body.

Referring to FIG. 1, there is shown a preferred embodiment of a chemical reactor vessel 11 in accordance with the invention, comprising a vessel body 13 and head 15. The vessel body, as shown in FIG. 1, comprises an inner body 17 and a surrounding body shell 19 spaced apart from the inner body 17. In operation the contained space 25 between the body shell 19 and the inner body 17 may be filled, e.g. with flowing brine for cooling purposes or steam for heating purposes. This general type of design of a vessel body 13 is known as "double-walled" or "multiple-walled" (in those cases where additional body walls are used successively, each encasing but spaced apart from the previous one, in succession, outwardly from the inner body to the outermost body shell).

The head 15 of the chemical reactor vessel 11 also includes an inner body surface 21 and a body shell surface 23 spaced apart from the inner body surface 21; the contained space 25 therebetween is used in the same manner as that mentioned above.

Mounted to the body shell surface 23 of the head 15 is an agitator drive means 27, e.g. an electric motor with a gear reduced right angle drive. Depending from, and axially aligned with the rotatable output shaft 28 of the agitator drive means 27, is an agitator assembly 29 comprising an agitator shaft 31 and an impeller 33.

Also mounted to the body shell surface 23 of the head 15 is an integrated television camera and high intensity light combination which comprise a closed circuit television system 35 for periodic or continuous monitoring of the phenomena occurring within the chemical reactor vessel 11. Also mounted to the body shell surface 23 of the head 15 is a fin baffle 37 which is mounted to and depends from a stuffing box 39. The fin baffle 37 is repositionable within the chemical reactor vessel 11 in that the fin 41 can be rotatably repositioned about the baffle shaft 43 by rotating the baffle shaft 43; this repositioning of the fin 41 varies the patterns and characteristics of fluid flow within the chemical reactor vessel 11.

At the bottom of the chemical reactor vessel 11 is an outlet 45 through which materials may be released or drained from the chemical reactor vessel 11. Also, the head 15 is removable from the vessel body 13 for purposes of, e.g. cleaning, repairs, changes of the agitator assembly, etc. The interior surface of the inner body 17 and the inner body surface 21 may have bonded thereto a glass or vitreous enamel coating, or it may be made of a relatively non-reactive metal such as stainless steel, or both may be present. The present invention is focused on, but not limited to, chemical reactor vessels which are made principally of metals, e.g., carbon steel, stainless steel, etc., to the surfaces of which a glass or vitreous enamel material is bonded to form a coating. The coated surfaces of the metals, at a minimum, are those which are exposed to the interior of the chemical reactor vessel 11 when in operation.

Figure 2:
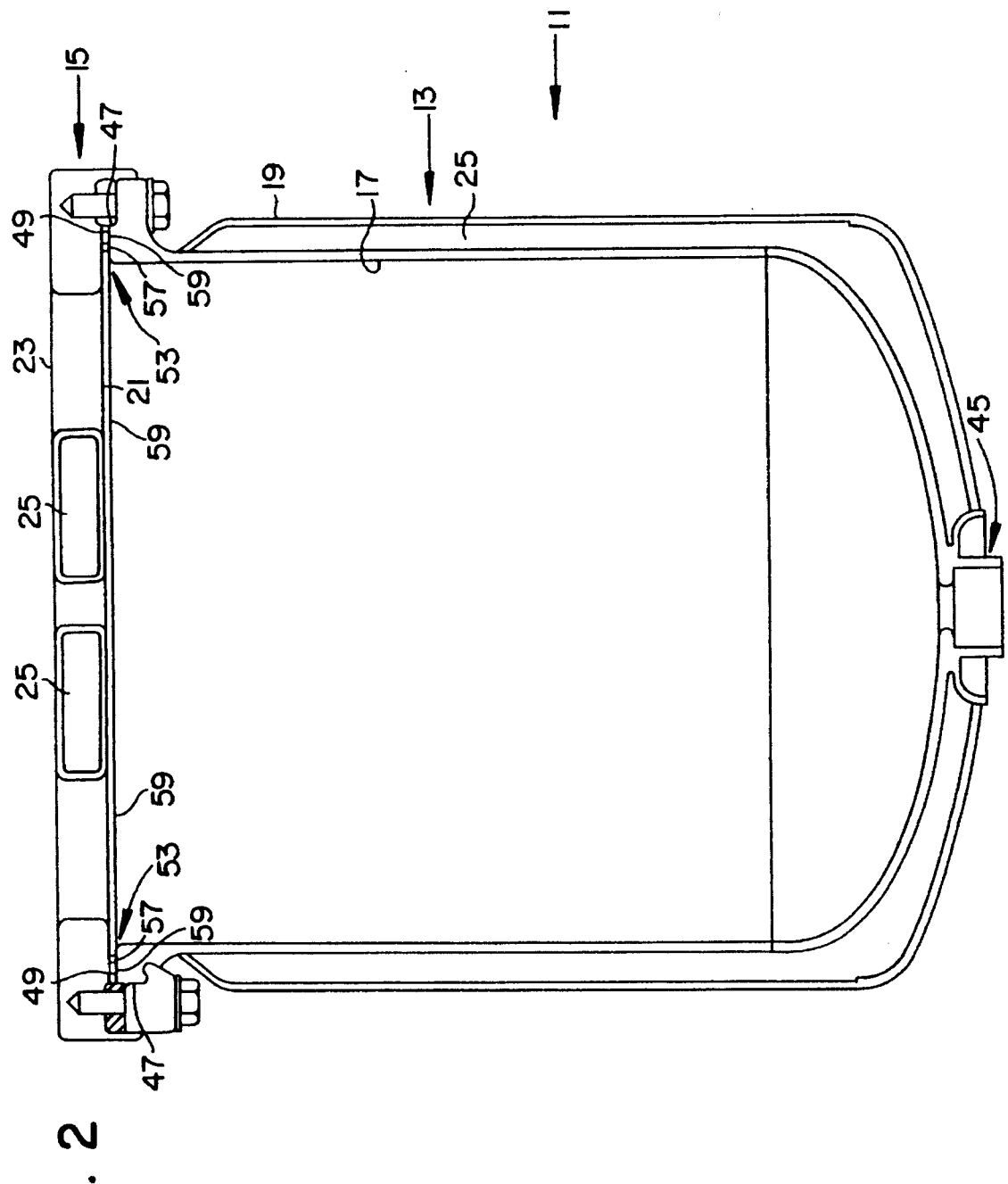
FIG. 2 is a semi-schematic, cross-sectional, cut-away, elevational view of a chemical reactor vessel including the body and the head, with the head being sealed to the body and attached thereto by alternate embodiments of the attachment means of the present invention.
Figure 3:
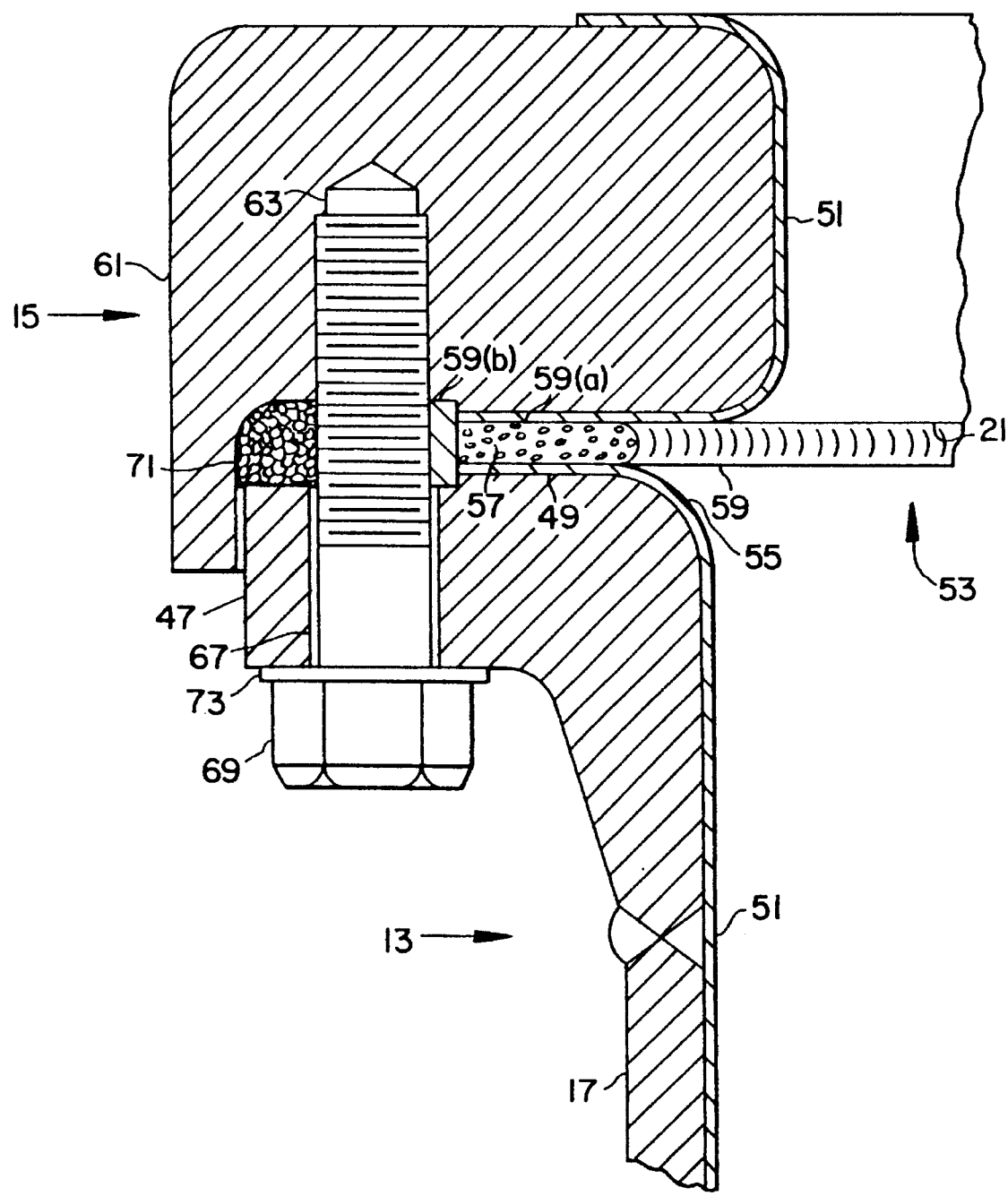
FIG. 3 is a semi-schematic, cross-sectional, cut-away, elevational view of a section of a chemical reactor vessel, including a section of the body and a section of the flat-design head, the head being attached and sealed to the body by one of the preferred sealing means of the present invention, in conjunction with one of the preferred attachment means.

FIG. 2 shows a chemical reactor vessel 11, similar to that shown in FIG. 1, but without any of the auxiliary attachments such as the agitator drive means 27, the agitator assembly 29, the television system 35, the fin baffle 37 or the stuffing box 39. Otherwise, the chemical reactor vessel 11 of FIG. 2 is generally equivalent to that shown in FIG. 1. In FIG. 2, the chemical reactor vessel 11 is shown in its operational position with the head 15 at the top, forming a generally horizontal plane, and with the outlet 45 at the bottom-most point of the vessel body 13. In viewing FIG. 2, as well as the other drawings, it will be noted that the uppermost areas of the vessel body 13 culminates in a flange 47 which, in the preferred embodiment, includes a generally flat, generally horizontally positioned surface, the body flange face 49. The body flange face 49 generally extends continuously, radially and circumferentially from the inner body surface 21 of the inner body 17, outwardly, away from the central axis of the inner body 17. The body flange face 49 also preferably has, bonded to it, a glass or vitreous enamel coating 51 as shown in FIGS. 3 and 4, in those embodiments where, at least the interior of the inner body 17 is likewise so coated. In those embodiments where coating 51 is used, it should be noted that the transition 53 from the interior surface of the inner body 17 to the body flange face 49 includes a radiused corner 55 to reduce and substantially eliminate localized stresses which would otherwise exist in relation to the coating 51 being applied over a sharp corner due to the rather brittle nature of glass or vitreous enamel materials used as coatings in relatively thinner overlays and the disparate relative rates of expansion and contraction, during temperature changes, in relation to metals.

FIG. 2 also shows that the head 15 has, as an extension of its inner body surface 21, a head flange face 57 which extends continuously, radially and circumferentially from the inner body surface 21, outwardly, away from the central axis of the head 15. The head flange face 57 preferably also has, bonded to it, a glass or vitreous enamel coating 51, as shown in FIGS. 3 and 4, in those embodiments where, at least, the interior of the inner body 17 and the body flange face 49, as well as the radiused corner 55 are, likewise, so coated. The body flange face 49 and the head flange face 57 are generally sized to correspond with each other.

When the head 15 and the vessel body 13 are fitted together, as shown in FIG. 2, the body flange face 49 is positioned on the bottom or lower surface of the head 15, i.e. the inner body surface 21, which is the operating position of the head 15 as attached to the vessel body 13 and as a part of the chemical reactor vessel 11. In fact, the body flange face 49, facing upwardly, would generally mate with the head flange face 57, facing downwardly, face surface-to-face surface, if not held separate from each other, which they are, by seal means 59 which functions to seal the joint between the head 15 and the vessel body 13 when such are attached together. Preferably, seal 59 is of a pliable material which is compressible to form a tight, leak-free joint between the head 15 and vessel body 13, compensating for and conforming to minor surface variations of the body flange face 49 and the head flange face 57, and the coating 51 thereon, if any.

Preferably, seal means 59 is a gasket which will resist chemical reaction with the materials to be processed within the chemical reactor vessel 11 and also will resist deterioration or failure due to temperature and pressure differentials which may be experience in the operation of the chemical reactor vessel 11. Seal means 59 might, alternatively, be an "O" ring or a packing. Examples of seal means 59 materials which could be applicable in some uses of chemical reactor vessels 11 are vulcanized neoprene materials and fluorinated polymer materials, e.g. Teflon®, both of which are well known and readily available in the market place. Such seal means 59 may be coated with metallic foil or may not, depending upon the application. The material of the seal means 59 may be resilient, i.e., capable of readily resuming its uncompressed, undeformed state, or it may be nonresilient. In certain applications, more than one material may comprise the seal means 59 as is exemplified in FIG. 3. Inner seal 59(*a*) is, preferably an elastic, deformable but resilient material whereas outer seal 59(*b*) is, preferably, a soft metal such as, for example, aluminum or copper which, when compressed, will readily deform and which, when the chemical reactor vessel 11 is under relatively great elevated pressure, will serve to prevent the blow-out of inner seal 59(*a*) as outer seal 59(*b*) will usually have a relatively greater tensile and yield strength in comparison to inner seal 59(*a*). On the other hand, because metal, as a seal material, is not as conformable, even under extreme compression, to surface imperfections of mating faces, usually metal, by itself, would not be the seal material of choice. In some situations, outer seal 59(*b*) may also function as a stop to prevent over-compression of inner seal 59(*a*).

Figure 3A:
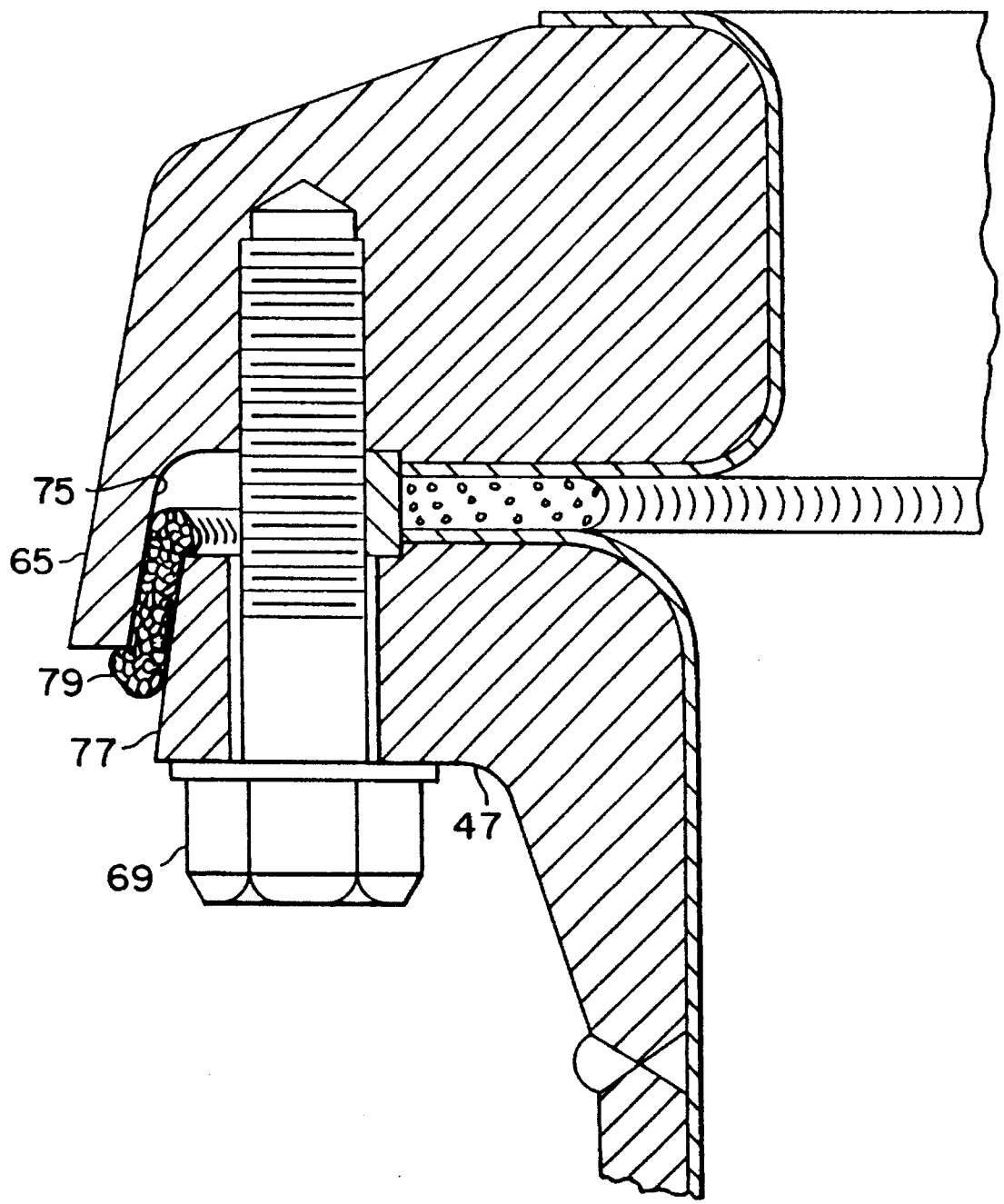
FIG. 3a is a semi-schematic, cross-sectional, cut-away, elevational view of a section of a chemical reactor vessel, including a section of the body and a section of the flat-design head, the head being attached and sealed to the body by another of the preferred sealing means of the present invention, in conjunction with one of the preferred attachment means.

In FIG. 3 outwardly beyond the head flange face 57, there is a further horizontal extension of the head 15, remote from the central axis of the head 15. This extension is the shield 61. The shield 61 is preferably solid metal which is capable of being and is drilled and tapped to form an integral, blind-bored female threaded fastener section 63, as shown, which functions as part of the clamping means which, in turn, serves to attach the head 15 to the vessel body 13 to comprise the chemical reactor vessel 11. The integration of fastener section 63 into shield 61 eliminates a separate female fastener which means, in each case of inclusion at fastener section 63, there is one less separate exposed piece on which contaminants can accumulate. As will be understood by those with skill in the art, shield 61 may taper downwardly, as shown in FIG. 3a, from the generally horizontal plane of head 15, as shown in FIGS. 1 and 2, rather than extend horizontally, the preferred arrangement, as shown in those same drawing figures as well as FIGS. 3 and 4.

The outer periphery of shield 61 comprises lip 65 which extends, generally downwardly in a vertical direction, substantially below the horizontal plane of inner body surface 21 and head flange face 57 of head 15 when head 15 is in its operational position. The peripheral size of lip 65 is established to be larger in diameter than the peripheral sizing of flange 47, such that lip 65, in the operating position of head 15 attached to vessel body 13, extends generally vertically downwardly, from the elevation at body flange face 49, to substantially surround and encompass flange 47; thus the jointure of body flange face 49 to head flange face 57 as separated by seal means 59 is not exposed to contaminants which are influenced by gravity, i.e., they run off, or fall off of the outer surface of shield 61 and lip 65. As will be understood by those with skill in the art, lip 65 might alternatively be arranged in the form of a downwardly and outwardly flaring hollow conical section, as shown in FIG. 3a, rather than the preferred vertically arranged hollow cylindrical section as shown best in FIGS. 3 and 4.

Again, referring to FIG. 3, it will be noted that flange 47 incorporates fastener aperture 67 through which extends bolt 69. Fastener aperture 67 is larger in diameter than bolt 69 to provide alignment and clearance such that bolt 69 can be readily threaded into fastener section 63 of shield 61, as will be well understood by those with skill in the art.

In operating position, with head 15 in position in relation to vessel body 13 and with seal means 59 in place, positioned between head flange face 57 and body flange face 49, bolt 69 is inserted through fastener aperture 67 in flange 47 and threaded into fastener section 63 of shield 61.

As will be understood by those with skill in the art, there are multiple fastener sections 63 in shield 61, those fastener sections 63 being located adjacent to the outer periphery of shield 61, usually equidistantly spaced apart from each other, but not necessarily so. Also, there are multiple fastener apertures 67 through flange 47, vertically alignable with and located to correspond with fastener sections 63 in shield 61 when the elements of chemical reactor vessel 11 are assembled. Of course, it follows, that each of fastener apertures 67 has inserted therethrough a bolt 69 which is threaded into corresponding fastener section 63. The number of fastener apertures 67 and corresponding bolts 69 and fastener sections 63 will depend, in part, on the size of chemical reactor vessel 11, in part, on the sectional thicknesses of shield 61 and flange 47 and, in part, on the pressure differentials anticipated in operating chemical reactor vessel 11. Probably the most important design consideration in determining the sectional thicknesses of shield 61 and flange 47 (the sectional thickness is the dimension, vertically, when the chemical reactor vessel is set up in its operating position as shown in FIGS. 1 and 2) is to eliminate localized distortion of those sections, shield 61 and flange 47, to a sufficient degree that, when bolts 69 are tightened into fastener sections 63, seal means 59 is compressed to the degree necessary to meet the pressure differential requirements for operation of chemical reactor vessel 11 (sufficient sealing to prevent leakage), but without any degree of distortion to body flange face 49, transition 53 or head flange face 57 which would cause any risk of coating 51 cracking or separating from its bond to those elements. The same consideration should be made when determining the quantity and exact location of fastener apertures 67, fastener sections 63 and, thus, bolts 69. This consideration is, of course, well known to those with skill in the art.

In previously known pressure vessels used in environments where cleanliness is a most important consideration (e.g. the pharmaceutical industry, the food industry, etc.) designs have tended to greatly increase the sectional thickness of the metal elements adjacent to sealed mating faces because exposed clamping devices are used. The clamping devices include many exposed areas which are susceptible to easy accumulation of contamination and which are relatively difficult to clean. Thus, the compulsion is to reduce, as much as possible, the number of clamping devices used while increasing the size of those that are used by increasing their size and increasing the sectional thickness of those elements to which the clamping devices apply pressure, thus increasing the rigidity thereof and decreasing the risk of distortion and cracking or separating of glass coatings at or near those points where each clamping device imposes a localized force. This design criteria, of course, significantly increases the cost but still does not eliminate exposed clamping devices; it merely reduces the number. The present invention cures the problem as the bolts 69, fastener apertures 67 and the fastener sections 63 are all relatively unexposed, all being located beneath and on the underside of shield 61 and being further enclosed by lip 65. Thus the sectional thicknesses of shield 61 and flange 47 can be decreased with a corresponding increase in the number of bolts 69, fastener apertures 67 and fastener sections 63. This provides a relative manufacturing cost reduction and flexibility in design in comparison to the presently accepted standards.

Again, referring to FIG. 3, optional additional means may be employed to further ensure cleanliness. Dirt seal 71 may be used in the form of, for example, a soft, close-celled elastomeric material which has a high compressibility, high resiliency, good deformability and which will also withstand localized elevated temperatures. In some applications, for example, a round cross-sectioned cord or rope of close-celled urethane synthetic rubber material might be used. The purpose of dirt seal 71 is to prevent the entry of any contamination into the area contiguous with seal means 59 adjacent to and surrounding those portions of bolts 69 which are therein exposed. Also optional is bolt gasket 73 which, in addition to any conventional bolt washer that might be used, would seal any threatened entry of contamination into fastener aperture 67.

Referring to FIG. 3a, there is an alternative to dust seal 71 which may be more effective, in some circumstances, in eliminating any possibility of contamination build-up. In the embodiment shown in FIG. 3a, the inner surface 75 of lip 65 is tapered, from top to bottom, downwardly and outwardly, forming a frustoconical section. The outer periphery 77 of flange 47 is, likewise, correspondingly and matingly tapered. Strip gasket 79, generally of the same materials used to form dirt seal 71, above, but in the form more of a flat belt than of a round cross-section cord, is interposed between inner surface 75 and outer periphery 77 such that, as bolts 69 are tightened, the distance between inner surface 75 and outer periphery 77 decreases, compressing strip gasket 59 and, thus, preventing the entry of any contamination up under lip 65.

FIG. 4 illustrates an alternative to flange 47, including fastener aperture 67. In FIG. 4, flange 81 is used, including body flange face 49 as incorporated with flange 47. Otherwise, flange 81 incorporates some differences in that, firstly, it does not extend outwardly beyond the end of coating 51 and, secondly, it includes ridge 83 which extends generally downwardly in a vertical direction, from body flange face 49, when chemical reactor vessel 11 is operationally positioned. Inwardly from ridge 83 and at a slightly higher elevation than ridge 83 is curl 85. Thus, the outer peripheral circumferential surface of flange 81, as viewed in FIG. 4, generally forms an "S" curve, with the "S" being turned about 90° counter-clockwise. Clamp 87 includes a corresponding "S" curve functioning as a hook 89 which engages curl 85 and ridge 83 thus becoming stationarily seated when vertically upward force is applied to clamp 87, as shown in FIG. 4. Clamp 87 includes fastener aperture 91 which is substantially identical to fastener aperture 67 in form and function. Bolts 69 are used to mount clamps 87 to flange 81 with hook sections 89 engaging ridge 83 and curl 85 and with bolt 69 being threaded into fastener sections 63, as is both described above and shown in FIG. 4. The number of clamps 87 to be used is a matter of design choice, using the same criteria described above in regard to choosing the number of combinations of fastener apertures 67, bolts 69 and fastener sections 63 in relation to FIG. 3.

An optional and additional means for preventing contamination build-up, especially in the area contiguous with seal means 59 adjacent to and surrounding bolt 69, as shown in FIG. 4, is to interpose flex bushing 93 between clamp 87 and shield 61, completely surrounding a threaded portion of bolt 69. Flex bushing 93 may be of the same materials exemplified in relation to strip gasket 79 and dirt seal 71.

Again referring to FIG. 4, it will be noted that head 95 is in a substantially different form from that shown in FIGS. 1 and 2 for head 15. Head 95 is a domed head while head 15 is a flat head. Either may be utilized in conjunction with the present invention.

In all preferred embodiments of the present invention, the following specific design characteristics, conceptionally, are utilized in designing the attaching and sealing means of a chemical reactor vessel: firstly, the means for retaining the fastening means, for example the fastener sections 63, is located under and is integral with the shield, as an integral extension of the head; secondly, the shield includes an integrated lip means which blocks the lateral approach of contaminants to the seal means and areas immediately adjacent to, and/or contiguous with, the seal means, such that, for contaminants to reach the seal means, they must migrate vertically upwards against the compulsion of gravity; thirdly, the means for fixing the head to the body, for example, fastener apertures 67 in flange 47, are also located under the shield and, preferably the means for fixing the head to the body is integral with the flange; and fourthly, all outer surfaces of the shield are smooth with rounded corners and without any appendages which might act as "dams" for contaminants or any areas which might be relatively difficult to clean.

Although the present invention has been described herein with a certain degree of particularity, it is to be understood that the present disclosure has been made as an exemplification of the preferred embodiment of the present invention, and the scope thereof is not considered limited by that description, but rather, is defined by what is hereinafter claimed.

What is claimed is:

1. A chemical reactor vessel comprising:

a) a vessel body having an opening surrounded by a vessel body first flange which has a body flange face;

b) a head having a head second flange, which has a head flange face, for attachment to said first flange;

c) sealing means disposed intermediate the first and second flange;

d) attachment means for securing the first and second flanges together with the sealing means intermediate the flange faces, said attachment means comprising clamping means for attaching the head to the vessel body so that the flange faces are compressed together against the sealing means to provide a seal which prevents leakage of fluids into and from the vessel; and e) shield means integral with and an extension of said head, said shield means having a lip which extends downwardly to surround and encompass the body first flange to prevent contaminants from contacting said attachment means, said sealing means and the flanges, said head and integral shield means being secured to the vessel by said attachment means such that said shield means cannot be separated from said vessel without first disassembling said attachment means and releasing compression from the first and second flanges.

2. The chemical reactor vessel of claim 1 wherein the attachment means includes a plurality of blind female threaded bolt holes, the central axis of the bolt holes projecting perpendicularly away from a plane generally formed by the faces of said flanges.

3. The chemical reactor vessel of claim 2 wherein said bolt holes are positioned to be alignable with corresponding unthreaded slip holes through the vessel body flange through which bolts can be slipped and threaded into the female bolt holes, said bolts, bolt holes and slip holes comprising the attachment means.

4. The chemical reactor vessel of claim 2 wherein the head is provided with a ridge and a curl in the form of an "S" curve to which conforming hook shaped clamps can be hooked in alignment with said bolt holes, said clamps being provided with unthreaded slip holes through which bolts may be passed and threaded into the bolt holes, said attachment means comprising said bolt holes, said clamps and said bolts.

5. The chemical reactor vessel of claim 1 wherein the sealing means is a deformable gasket positioned between the head flange face and the body flange face.

* * * * *